United States Patent
Eidt et al.

(10) Patent No.: US 8,959,501 B2
(45) Date of Patent: Feb. 17, 2015

(54) TYPE AND LENGTH ABSTRACTION FOR DATA TYPES

(75) Inventors: Carol Thompson Eidt, Campbell, CA (US); David L. Detlefs, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 12/968,148

(22) Filed: Dec. 14, 2010

(65) Prior Publication Data

US 2012/0151188 A1  Jun. 14, 2012

(51) Int. Cl.
 *G06F 9/45* (2006.01)
 *G06F 9/44* (2006.01)
 *G06F 9/455* (2006.01)

(52) U.S. Cl.
 CPC .............. *G06F 8/20* (2013.01); *G06F 9/45516* (2013.01)
 USPC ............ 717/151; 717/136; 717/150; 717/160

(58) Field of Classification Search
 USPC .................................. 717/151, 160, 136, 150
 See application file for complete search history.

(56) References Cited

U.S. PATENT DOCUMENTS

| | | | | |
|---|---|---|---|---|
| 5,764,787 A | * | 6/1998 | Nickerson | 382/107 |
| 6,113,650 A | * | 9/2000 | Sakai | 717/160 |
| 6,202,077 B1 | * | 3/2001 | Smith | 708/523 |
| 6,425,054 B1 | * | 7/2002 | Nguyen | 711/117 |
| 7,168,069 B1 | * | 1/2007 | Sigmund | 717/140 |
| 8,171,461 B1 | * | 5/2012 | Kilgard et al. | 717/136 |
| 2003/0126176 A1 | * | 7/2003 | Devir | 708/520 |
| 2003/0145031 A1 | * | 7/2003 | Suzuki | 708/524 |
| 2004/0181652 A1 | * | 9/2004 | Ahmed et al. | 712/215 |
| 2007/0174828 A1 | * | 7/2007 | O'Brien et al. | 717/151 |
| 2008/0104574 A1 | * | 5/2008 | Mak et al. | 717/120 |
| 2008/0114937 A1 | * | 5/2008 | Reid et al. | 711/117 |
| 2010/0293534 A1 | * | 11/2010 | Andrade et al. | 717/146 |

FOREIGN PATENT DOCUMENTS

CN  1688966 A  10/2005

OTHER PUBLICATIONS

Thakkar et al, "The Internet Streaming SIMD Extensions", 1999.*
Zhou et al, "Implementing Database Operations Using SIMD Instructions", Jun. 4-6, 2002.*
"First Office Action Received for China Patent Application No. 201110436673.8", Mailed Date: Nov. 5, 2013, Filed Date: Dec. 13, 2011, 12 Pages. (MS# 331241.02).
"Second Office Action Received for China Patent Application No. 201110436673.8", Mailed Date: Jun. 17, 2014, Filed Date: Dec. 13, 2011, 9 Pages. (MS# 331241.02).

* cited by examiner

*Primary Examiner* — Chat Do
*Assistant Examiner* — Jae Jeon
(74) *Attorney, Agent, or Firm* — Kevin Sullivan; Raghu Chinagudabha; Micky Minhas

(57) ABSTRACT

Embodiments are directed to implementing a generic SIMD data type in software code. In an embodiment, a computer system accesses a portion of software code that includes an algorithm with a generic SIMD data type that includes a variable number of elements. The algorithm with the generic SIMD data type is to be processed by a specific processor that includes various specific hardware features. The computer system determines at runtime a portion of customized processor-specific code that is to be used with the specified processor based on the generic SIMD data type, wherein the runtime determination resolves the number of elements that are to be used with the specified processor. The computer system also processes the software code including the algorithm with the generic SIMD data type using the determined, customized processor-specific code.

16 Claims, 3 Drawing Sheets

TYPE AND LENGTH ABSTRACTION FOR DATA TYPES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed for execution on a specific processor or processing system. For example, software code for a particular application may include instructions that operate on more than one data item at once (single instruction multiple data instructions, or SIMD instructions), and which are specific to a certain type of processor. Such specific instructions are often used with used with number-oriented data types including int, float and double. In some cases, software compilers may be configured to perform auto-vectorization which changes software code for use with a specific processor. However, auto-vectorization does not work well with all types of software code.

BRIEF SUMMARY

Embodiments described herein are directed to implementing a generic SIMD data type in software code. In one embodiment, a computer system accesses a portion of software code that includes an algorithm with a generic SIMD data type that includes a variable number of elements. The number of elements is not determined until runtime, but is available to the algorithm as a property of the generic SIMD data type. The algorithm with the generic SIMD data type is to be processed by a specific processor that includes various specific hardware features. The computer system determines at runtime a portion of customized processor-specific code that is to be used with the specified processor based on the generic SIMD data type, wherein the runtime determination resolves the number of elements that are to be used with the specified processor. The computer system also processes the software code including the algorithm with the generic SIMD data type using the determined, customized processor-specific code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
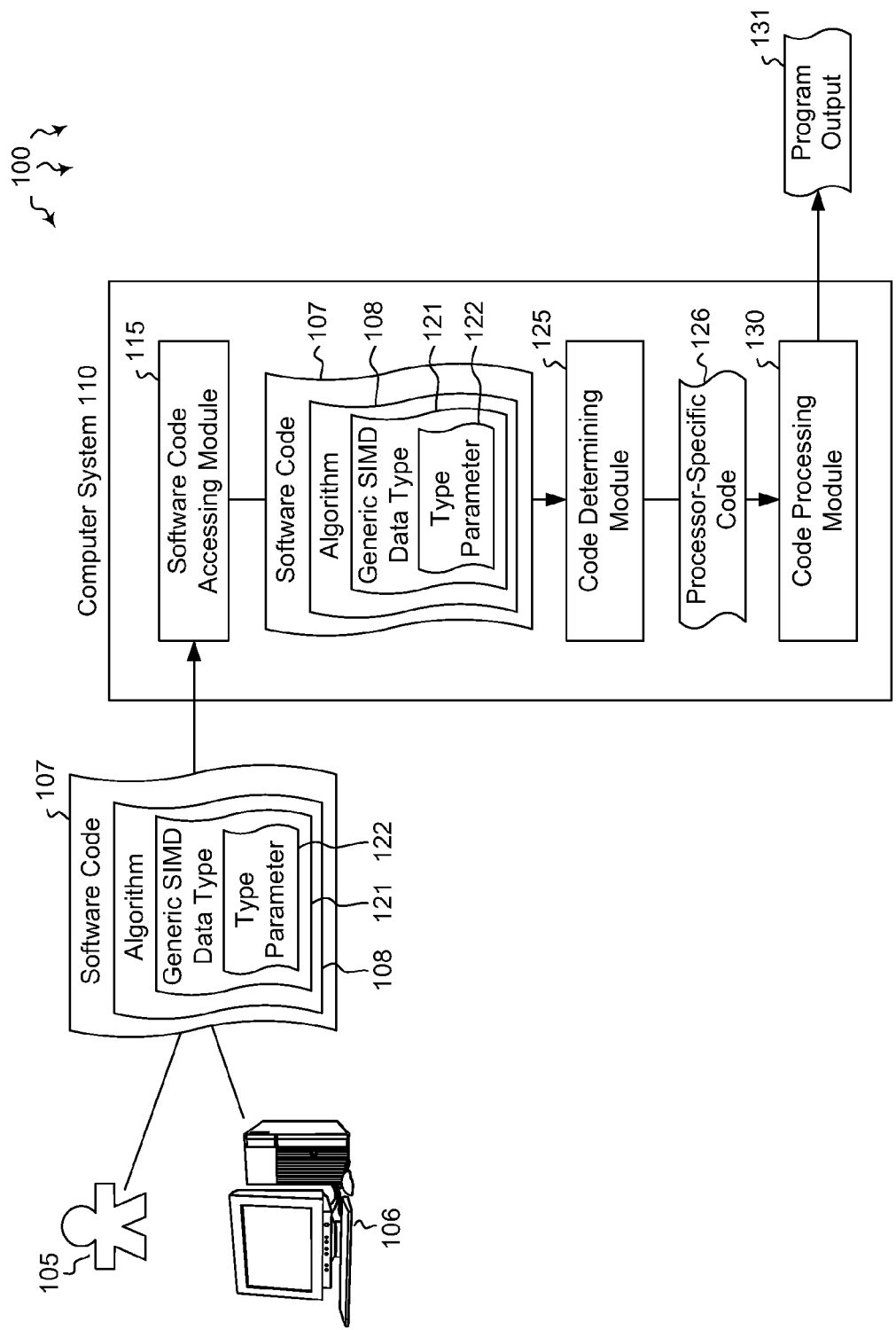
FIG. 1 illustrates a computer architecture in which embodiments of the present invention may operate including implementing a generic type in software code.

Embodiments described herein are directed to implementing a generic SIMD data type in software code. In one embodiment, a computer system accesses a portion of software code that includes an algorithm with a generic SIMD data type that includes a variable number of elements. The algorithm with the generic SIMD data type is to be processed by a specific processor that includes various specific hardware features. The computer system determines at runtime a portion of customized processor-specific code that is to be used with the specified processor based on the generic SIMD data type, wherein the runtime determination resolves the number of elements that are to be used with the specified processor. The computer system also processes the software code including the algorithm with the generic SIMD data type using the determined, customized processor-specific code The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of local or distributed computing system including a cloud computing system. The computer system may be configured to access software code 107 from a variety of different sources. These sources may include computer users (e.g. user 105), computer systems (e.g. system 106), software applications, data stores (local or remote) or other sources. The software code may be written in various different formats and may be processed by computer system 110. The code may include algorithms that operate on different portions of data. The data may include multiple elements of a single type. In some cases, an algorithm may operate on multiple portions of data that include multiple elements of a single type. The software code may be accessed by software code accessing module 115, and may include one or more algorithms 108. Each algorithm may include one or more generic SIMD data types.

The software code accessed by the code accessing module may be processed, formatted or otherwise changed, or may be passed directly on by code determining module 125. Module 125 may receive the software code with its algorithms and generic SIMD data types. The generic SIMD data types may be abstracted by size, by data type or both. Accordingly, the generic SIMD data type may be instantiated with various different data types of varying sizes. In some cases, the data types may be numeric primitives such as int, short, long, float, double and byte, as well as both signed and unsigned variants of the integral data types. The data may be structured in an array of customizable size. Thus, the generic type may include any of a variety of different data types, and may be a different size, depending on the data type.

The generic SIMD data type 121 may include a type parameter 122 which specifies information about the type that is actually going to be used in the processing of the data input. Accordingly, the type parameter 122 may specify that the data type is to be int, or float, or double or substantially any other data type. The type parameter may also include metadata or other contextual information that provides additional details about the data type that is to be used. It should be noted that, as used herein, the type parameter 122 may refer to a "formal" parameter (e.g. the "T" in VectorBase<T> in the examples below) or to an "actual parameter" (e.g. when code that uses VectorBase instantiates it (to, for example, VectorBase<float>), "float" is the actual parameter). It may be assumed below that in examples where "VectorBase<T>" is used, the type parameter is referring to the formal parameter "T", and in other cases, the type parameter is referring to the actual parameter.

The software code, including generic SIMD data type 121, and type parameter 125, may be passed to code determining module 125 which determines which specific portion of code is to be used based on which type of processor is going to be used to process the data and which data type is specified in the type parameter 122. The code determining module may have a specified processor that it uses each time, may have a list of available processors and may choose from those processors, or, at least in some cases, may allow the user 105 to specify which processor is to be used to process the inputted data 107. Code determining module 125 may send its code determination 126 to code processing module 130 where the code is processed by the specified processor. The results of the processing (e.g. program output 131) may be sent to the user, to another computer system or to a storage system.

In some cases, the processor(s) of computer system 110 may offer single instruction multiple data (SIMD) capabilities. These capabilities offer increased performance, by providing special "vector registers" capable of holding several data items simultaneously, and special vector operations on these registers that are performed in parallel on each of the data items in the register(s). Different processors may offer different SIMD capabilities. For instance, processors may offer different data types that can be contained within a vector register, different sets of supported operations, different instruction encodings, and different vector register widths.

In some cases, for example, some SIMD extensions may allow parallel operations over four floating-point values, while other processors may allow 16. Using the various modules of computer system 110, developers may use SIMD features in the processing of their applications via a high-level abstraction, without having to explicitly enter the details of the target processor (e.g. data width, specific functions provided, encoding, etc.). Developers may abstract vector registers as a generic SIMD data type 121 (which, at least in some cases, may be called VectorBase<T>). The generic SIMD data type 121 may be a higher level generic SIMD data type which is abstracted by size and/or type; in SIMD implementations, this corresponds to the number and type of values that can be contained in a vector register. The generic SIMD data type's size may be queried programmatically. Moreover, the generic type can be instantiated over substantially all of the currently existing primitive numeric types. The generic SIMD data type provides standard arithmetic operations, which may be mapped by a compiler to a target instruction set. The operations may include add, multiply, shift, and other operations.

In some embodiments, a generic type VectorBase<T> may be instantiated over one or more primitive types (integer, floating point, etc.). This generic SIMD data type provides a range of operations which enable users to develop a single implementation of their algorithm, while applying it to a range of numeric types or precisions. The generic SIMD data type allows for translation to a target architecture, as the operations on VectorBase<T> have been chosen with knowledge of common SIMD instructions sets, so they usually translate directly into a short sequence of SIMD processor instructions, often just a single instruction. The generic type also provides a high-level programming model, which allows developers or other users to write code that is both target-independent and can be instantiated over a range of element types. In some cases, the target processor may be fixed at development time. The concepts mentioned above will be explained in greater detail below with regard to method 200 of FIG. 2.

Figure 2:
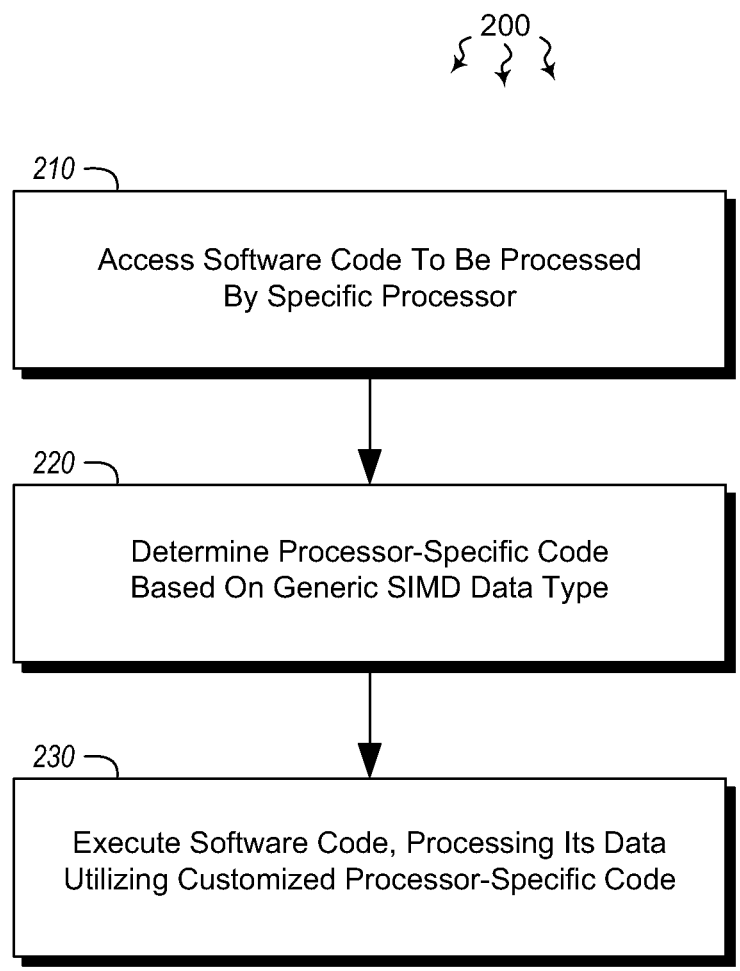
FIG. 2 illustrates a flowchart of an example method for implementing a generic SIMD type in software code.

In view of the systems and architectures described above, methodologies that may be implemented in accordance with the disclosed subject matter will be better appreciated with reference to the flow charts of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing a generic SIMD data type in software code. The method 200 will now be described with frequent reference to the components and data of environments 100 and 300 of FIGS. 1 and 3, respectively.

Method 200 includes an act of accessing a portion of software code that includes an algorithm with a generic SIMD data type, the generic SIMD data type including a variable number of elements, wherein the algorithm with the generic SIMD data type is to be processed by a specific processor that includes one or more specific hardware features (act 210). For example, software code accessing module 115 may access software code 107 which is to be processed by a specific processor. Processors may support SIMD instruction sets whose vector registers are of various widths. Accordingly, some processors may be able to perform more or fewer simultaneous operations.

For instance, on a processor whose vector registers are 128 bits wide, the generic SIMD data type may be instantiated with a 32-bit float data type. The width of that instantiation on that processor would be four elements, the number that may be simultaneously processed by a SIMD instruction. In other cases, the generic type may be instantiated with a double data type, where two elements at a time are processed by a SIMD instruction. Many other combinations are possible.

In some cases, the portion of software code 107 that is to be processed may include an algorithm with multiple different SIMD instructions. For instance, if the input were an algorithm or software function, that function may include the different SIMD instructions. These instructions may be taken into consideration when determining which code (i.e. the processor-specific code) is to be used with a currently-selected processor. The data portion may be structured in an array or other data structure. The elements of the array may be of an arbitrary data type, which may be specified in the generic type 121 with the type parameter 122.

Figure 3:
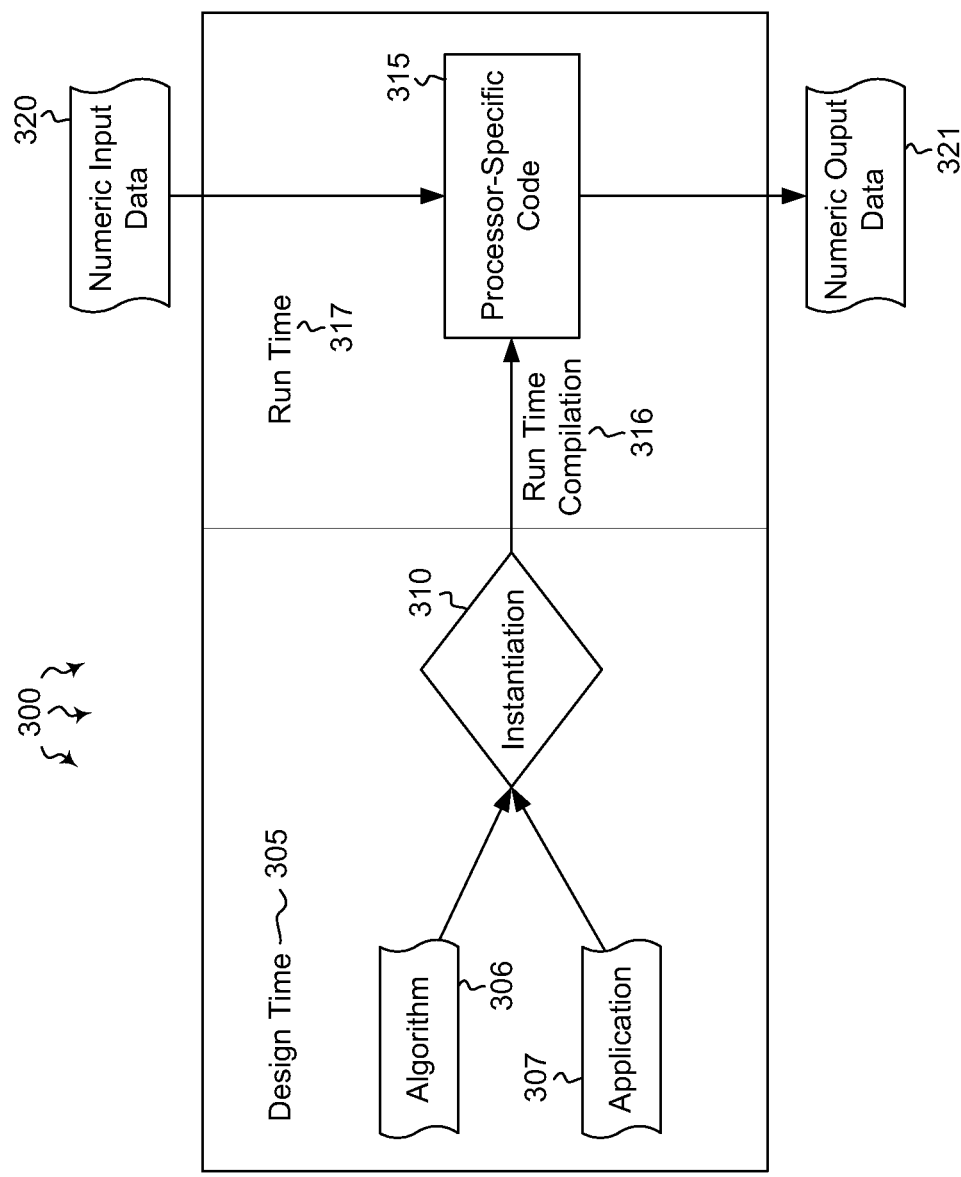
FIG. 3 illustrates an alternative architecture for implementing a generic SIMD type in software code.

As shown in FIG. 3, during runtime compilation 316 by runtime 317, the computing system uses the primitive generic parameter type and the width of the vector registers on the current hardware platform to determine the number of elements of the primitive type that the instantiated generic contains on this platform. The generic SIMD data type may be instantiated 310 at design time 305 where an algorithm 306 that implements the generic type is used in an application 307. The generic type may be used to determine which processor-specific code to use, whereupon the numeric input data 320 may be processed and output 321.

In one embodiment, algorithm 306 may be a high-level algorithm operating on VectorBase<T> values. Since these values will be stored in vector registers, and operations on VectorBase<T> values map to the hardware's parallel vector operations, writing the algorithm in this manner may enable increases in speed. The algorithm may take input arrays of type T, and consider them as sequences of VectorBase<T> values. To enable this, VectorBase<T>. Length may be used to represent the number of values of type T in a VectorBase<T> (i.e., the number that fit into a vector register on the current hardware platform). The algorithm may therefore input every sequence of VectorBase<T>. Length T's in an array as a different VectorBase<T>. Thus, the high-level algorithm remains generic over the width of the vector registers.

Application 307 may be an application that implements the high-level algorithm for a specific number type T. The generic type may be instantiated 310 and used in runtime compilation 316 to determine processor-specific SIMD code for type T (315). The numeric input 320 may comprise one or more arrays of the primitive type T used in the application 307. The determined processor-specific SIMD code may process the arrays using primitives appropriate for the specified type parameter 122. The numeric output 321 may include one or more arrays of primitive type T. Accordingly, a generic type may be implemented that is abstracted over type and size.

As mentioned above, the generic SIMD data type may be configured to implement many different data types including at least the following data types: int, short, long, float, double, and byte, as well as both signed and unsigned variants of the integral data types. In some cases, the generic SIMD data type may be instantiated with a float data type. Here, four elements at a time might be processed in a SIMD instruction, for a particular SIMD instruction set operating on vector registers able to contain four float values. In other cases, the generic type may be instantiated with a double data type. Here, two elements at a time would be processed by a SIMD instruction (for that same SIMD instruction set). The generic type may be used with a single processor or multiple processors and may be used with multiple different processing threads located on one or more computing systems.

Method 200 includes an act of determining at runtime a portion of customized processor-specific code that is to be used with the specified processor based on the generic SIMD data type, wherein the runtime determination resolves the number of elements that are to be used with the specified processor (act 220). For example, code determining module 125 may determine at runtime 317 a portion of customized processor-specific code 126/315 that is to be used with the specified processor based on the generic SIMD data type 121. The proper type of processor-specific code may be determined dynamically at runtime by code determining module 125 of computer system 110. The processor specific code may be selected by the code processing module 130 at runtime, or at such time as the target processor is known. In some cases, this could be after design time, but before runtime, but would be performed by the runtime system including code determining module 125.

Method 200 includes an act of processing the software code including the algorithm with the generic SIMD data type using the determined, customized processor-specific code (act 230). For example, code processing module 130 may process the processor-specific code including the algorithm 108 with generic SIMD data type 121 using the determined, customized processor-specific code 126. The code may be selected and run during runtime 317.

In some cases, the numeric input data 320 may include data arrays of different types. Thus, more than one data type may be present in the input data. Accordingly, code processing module 130 may select different processor-specific code for each different data type. This selection may be performed dynamically and without user intervention. The computer system 110 may query the selected or specified processor to determine the width of its vector registers.

Accordingly, systems, methods and computer program products are provided which implement a generic SIMD data type in software code. The generic type may be abstracted by size and/or data type. Moreover, systems, methods and computer program products are provided which provide a generic SIMD data type that includes an implicitly-generic number of elements of the data type over which it is instantiated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for implementing a generic single instruction multiple data (SIMD) type in software code, the method comprising:
   accessing a portion of software code that includes an algorithm comprising a generic SIMD data type, the generic SIMD data type being an abstraction of a vector register of an unspecified type and size, the SIMD data type including a type parameter which specifies information about the type that is to be used in processing the data, enabling the algorithm with the generic SIMD data type to be processed by a specific processor that includes one or more specific hardware features, such that the specified processor and the specific hardware features need not be known when the algorithm is coded;
   determining at runtime, based at least on the generic SIMD data type and a width of the vector register, a number of elements of the generic SIMD data type that an instantiated generic SIMD data type contains when instantiated in accordance with the specific hardware features;
   determining at runtime, based at least on the generic SIMD data type and the included type parameter, a portion of customized processor-specific code that is to be used with the specified processor, wherein the runtime determination resolves the abstraction of a vector register into a specific instantiation of a vector register wherein the number of elements that are to be used with the specified processor are known; and processing the software code including the algorithm with the generic SIMD data type using the determined, customized processor-specific code;
   wherein the specific hardware features comprise registers that are configurable to include a certain number of elements of one or more types, and associated instructions which operate on those elements in parallel;
   querying the specified processor to determine its number of registers.

2. The method of claim 1, wherein the generic SIMD data type is instantiated over a primitive type.

3. The method of claim 2, wherein the generic SIMD data type is queryable to determine how many elements of the primitive type the generic SIMD data type includes.

4. The method of claim 1, wherein the generic SIMD data type is abstracted by element type, such that the generic SIMD data type has a variable data type.

5. The method of claim 4, wherein the generic SIMD data type is configured to implement at least the following data types: int, short, long, float, double and byte.

6. The method of claim 1, wherein the generic SIMD data type provides one or more standard arithmetic or logical operations.

7. The method of claim 6, wherein the generic SIMD data type is instantiated with a float data type, such that four elements at a time are processed by a SIMD instruction.

8. The method of claim 6, wherein the generic SIMD data type is instantiated with a double data type, such that two elements at a time are processed by a SIMD instruction.

9. The method of claim 1, further comprising performing one or more operations on at least two arrays of the same data type to yield a third, different array of that data type.

10. The method of claim 1, further comprising receiving at runtime a portion of numeric data structured in an array of an arbitrary data type.

11. The method of claim 1, wherein the generic SIMD data type is implemented with a plurality of processing threads.

12. A computer program product for implementing a method for providing a generic SIMD data type that includes an implicitly-generic number of elements of a generic SIMD data type, the computer program product comprising one or more computer- readable hardware devices having stored thereon computer-executable instructions that, when executed by one or more processors of the computing system, cause the computing system to perform the method, the method comprising:
   accessing a portion of software code that includes an algorithm comprising a generic SIMD data type, the generic SIMD data type being an abstraction of a vector register of an unspecified type and size, the SIMD data type including a type parameter which specifies information about the type that is to be used in processing the data, enabling the algorithm with the generic SIMD data type to be processed by a specific processor that includes one or more specific hardware features, such that the specified processor and the specific hardware features need not be known when the algorithm is coded;

determining at runtime, based at least on the generic SIMD data type and a width of the vector register, a number of elements of the generic SIMD data type that an instantiated generic SIMD data type contains when instantiated in accordance with the specific hardware features;

determining at runtime, based at least on the generic SIMD data type and the included type parameter, a portion of customized processor-specific code that is to be used with the specified processor, wherein the runtime determination resolves the abstraction of a vector register into a specific instantiation of a vector register wherein the number of elements that are to be used with the specified processor are known; and processing the software code including the algorithm with the generic SIMD data type using the determined, customized processor-specific code;

wherein the specific hardware features comprise registers that are configurable to include a certain number of elements of one or more types, and associated instructions which operate on those elements in parallel;

querying the specified processor to determine the number of elements that are stored in and processed using its registers.

13. The computer program product of claim 12, wherein the generic SIMD data type is abstracted both by element size, such that the generic SIMD data type has a variable size, and by element type, such that the generic SIMD data type has a variable data type.

14. The computer program product of claim 12, wherein the generic SIMD data type provides one or more standard arithmetic or logical operations.

15. A computer system comprising the following:
one or more processors;
system memory;
one or more computer-readable storage media having stored thereon computer-executable instructions that, when executed by the one or more processors, causes the computing system to perform a method for providing a generic SIMD data type that has a variable data type, the method comprising the following: accessing a portion of software code that includes an algorithm comprising a generic SIMD data type, the generic SIMD data type being an abstraction of a vector register of an unspecified type and size, the SIMD data type including a type parameter which specifies information about the type that is to be used in processing the data, enabling the algorithm with the generic SIMD data type is to be processed by a specific processor that includes one or more specific hardware features, such that the specified processor and the specific hardware features need not be known when the algorithm is coded;

determining at runtime, based at least on the generic SIMD data type and a width of the vector register, a number of elements of the generic SIMD data type that an instantiated generic SIMD data type contains when instantiated in accordance with the specific hardware features;

determining at runtime, based at least on the generic SIMD data type and the included type parameter, a portion of customized processor-specific code that is to be used with the specified processor, wherein the runtime determination resolves the abstraction of a vector register into a specific instantiation of a vector register wherein the number of elements that are to be used with the specified processor are known; and processing the software code including the algorithm with the generic SIMD data type using the determined, customized processor-specific code;

wherein the specific hardware features comprise registers that are configurable to include a certain number of elements of one or more types, and associated instructions which operate on those elements in parallel;

querying the specified processor to determine its number of registers.

16. The system of claim 15, wherein the generic SIMD data type is abstracted both by element size, such that the generic SIMD data type has a variable size, and by element type, such that the generic SIMD data type has a variable data type.

* * * * *